LAUTENSCHLAGER & GOTT.
Tobacco Pipe.
No. 52,297.  Patented Jan'y 30, 1866.
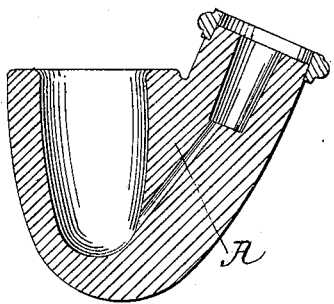
Witnesses.
Wm Treuen
Theo Fusch
Inventors.
Gustav Lautenschlager
George L Gott

UNITED STATES PATENT OFFICE.

GUSTAV LAUTENSCHLAGER AND GEORGE L. GOTT, OF NEW YORK, N. Y.

TOBACCO-PIPE.

Specification forming part of Letters Patent No. 52,297, dated January 30, 1866; antedated January 17, 1866.

*To all whom it may concern:*

Be it known that we, GUSTAV LAUTENSCHLAGER and GEORGE L. GOTT, of the city, county, and State of New York, have invented a new and useful Improvement in Smoking-Pipes; and we do hereby declare that the following is a full, clear, and exact description thereof, which will enable those skilled in the art to make and use the same, reference being had to the accompanying drawing, forming part of this specification.

The drawing represents a vertical central section of this invention.

It is a well-known fact that coal of any description, be it animal, vegetable, or mineral, is a superior deodorizing and absorbent agent. Based on this fact is this present invention, which consists in a bowl or saliva-reservoir for tobacco-pipes made of coal-dust prepared with pitch, rosin, or other suitable cement, and then pressed and formed in suitable molds or cut out, and finally heated to a red heat in a kiln or in an open fire.

The bowl A represented in the drawing is prepared by mixing coal-dust with a small quantity of pitch, and after having been formed by hand it is cut and hollowed out, and finally heated to a red heat in a common stove.

In the manufacture of this bowl we have used charcoal-dust; but we do not wish to confine ourselves to any particular coal, and reserve the right to use animal or mineral coal of any description.

In manufacturing our bowls for the trade we propose to use suitable molds and presses, so that the work can be performed expeditiously and with neatness; and we also propose to build a kiln of suitable dimensions and internal construction for the purpose of burning the bowls after the same have been formed.

A bowl of this kind absorbs all the narcotic oil of the tobacco and the saliva accumulating in the same, and the smoke which reaches the mouth of the smoker is dry and healthy.

If desired, the saliva-reservoir alone may be made of our composition, and a bowl of any other description may be used in connection with it; but we prefer to make bowl and saliva-reservoir both out of our composition, as previously described.

We claim as new and desire to secure by Letters Patent—

A bowl or saliva-reservoir for a smoking-pipe made of coal-dust mixed with pitch or other suitable cement and formed substantially as and for the purposes described.

GUSTAV LAUTENSCHLAGER.
GEORGE L. GOTT.

Witnesses:
M. M. LIVINGSTON,
C. L. TOPLIFF.